US006979966B2

(12) United States Patent
Barrenscheen et al.

(10) Patent No.: US 6,979,966 B2
(45) Date of Patent: Dec. 27, 2005

(54) METHOD AND DEVICE FOR DETECTING THE MOTOR POSITION OF AN ELECTRIC MOTOR

(75) Inventors: Jens Barrenscheen, München (DE); Marcus Nuebling, Olching-Estling (DE)

(73) Assignee: Infineon Technologies AG, Munich (DE)

( * ) Notice: Subject to any disclaimer, the term of this patent is extended or adjusted under 35 U.S.C. 154(b) by 15 days.

(21) Appl. No.: 10/371,140

(22) Filed: Feb. 21, 2003

(65) Prior Publication Data

US 2003/0155877 A1 Aug. 21, 2003

(30) Foreign Application Priority Data

Feb. 21, 2002 (DE) .......................................... 102 07 338

(51) Int. Cl.[7] ................................................ H02P 7/00
(52) U.S. Cl. ........................ 318/254; 318/138; 318/439
(58) Field of Search ................................. 318/254, 138, 318/439

(56) References Cited

U.S. PATENT DOCUMENTS

| | | | | |
|---|---|---|---|---|
| 5,990,643 | A | * | 11/1999 | Holling et al. ............... 318/254 |
| 6,121,736 | A | * | 9/2000 | Narazaki et al. ............. 318/254 |
| 6,172,474 | B1 | * | 1/2001 | Gotou .......................... 318/254 |
| 6,204,621 | B1 | * | 3/2001 | Gotou .......................... 318/599 |
| 6,291,961 | B1 | * | 9/2001 | Gotou .......................... 318/599 |
| 6,351,091 | B1 | * | 2/2002 | Heinkel et al. ............. 318/254 |
| 6,400,107 | B1 | * | 6/2002 | Nakatani et al. ............. 318/254 |
| 6,479,956 | B1 | * | 11/2002 | Kawabata et al. .......... 318/254 |
| 6,650,082 | B1 | * | 11/2003 | Du .............................. 318/701 |

FOREIGN PATENT DOCUMENTS

DE 100 36 413 A1 2/2002

OTHER PUBLICATIONS

Richard Oswald et al.: "The Brushless Spindle Motor: A background in the motors, magnetics, electrical circuits, and control systems", pp. 23–26.
Marcel Jufer et al.: "Back EMF Indirect Detection for Self–Commutation of Synchronous Motors", *European Power Electronics, Glenoble*Sep. 22–24, 1987, pp. 1125–1129.

* cited by examiner

*Primary Examiner*—Rita Leykin
(74) *Attorney, Agent, or Firm*—Laurence A. Greenberg; Werner H. Stemer; Gregory L. Mayback

(57) ABSTRACT

A method and device for detecting the motor position of a DC motor includes evaluating the back-induced voltage of non-energized motor windings of the motor only during predetermined time durations whose temporal position and duration are derived from drive signals for half-bridge circuits that are connected to the motor windings.

30 Claims, 8 Drawing Sheets

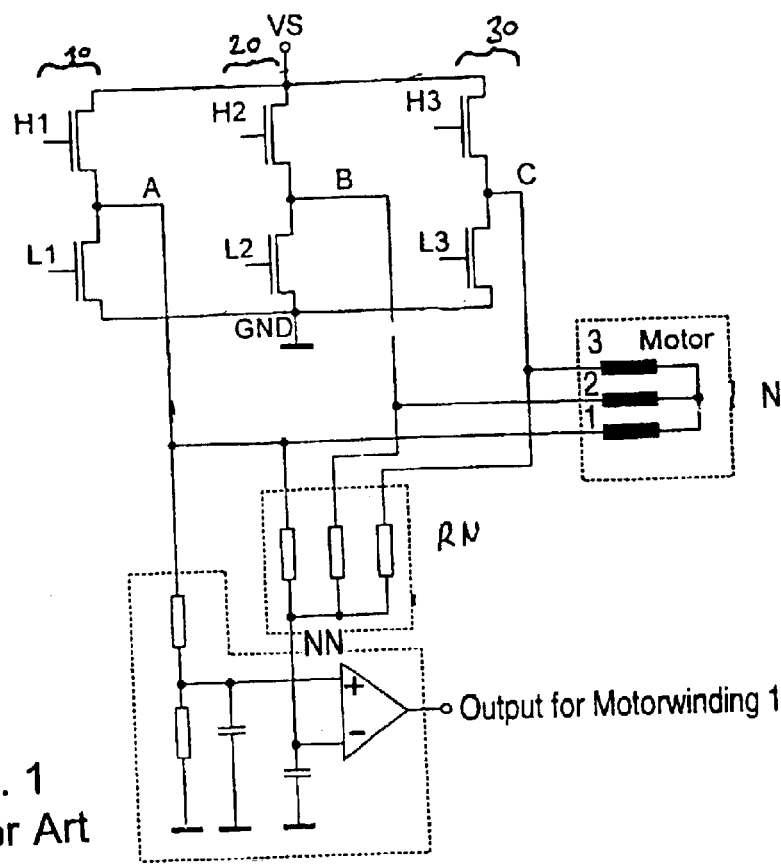
FIG. 1
Prior Art
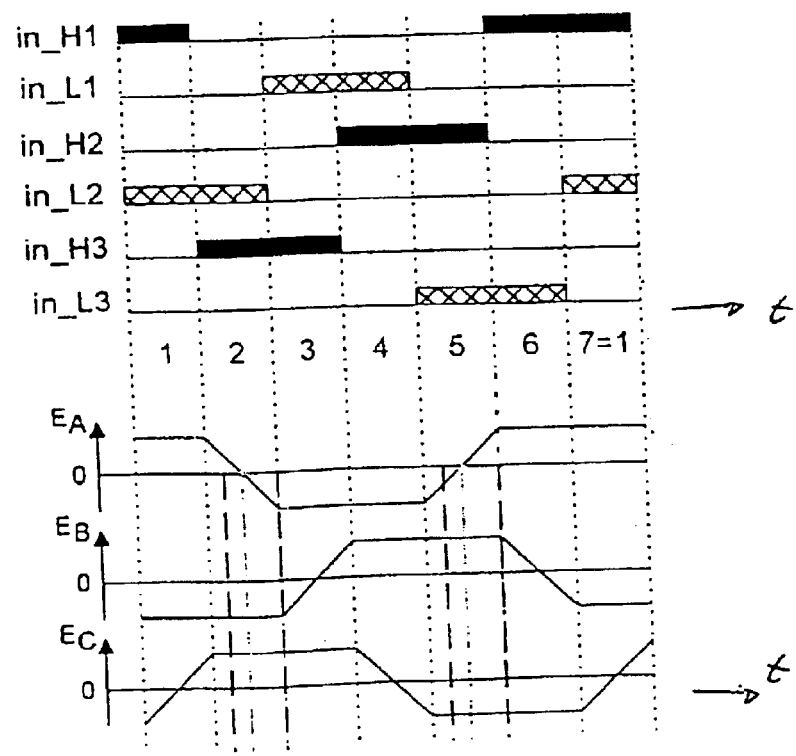
FIG. 2A
Prior Art
FIG. 2B
Prior Art

US 6,979,966 B2

METHOD AND DEVICE FOR DETECTING THE MOTOR POSITION OF AN ELECTRIC MOTOR

BACKGROUND OF THE INVENTION

1. Field of the Invention

The present invention relates to a method and a device for detecting the motor position of a synchronous motor or of a brushless DC motor.

To drive a DC motor, it is known for the motor windings to be optionally connected to a first or second drive potential through respective half-bridge circuits each having two series-connected semiconductor switches. The individual semiconductor switches are driven in a predetermined, periodically recurring "drive pattern" in order to generate a rotating field that brings about a motor rotation. "Drive pattern" designates the totality of the mutually coordinated temporal profiles of the switching states of the semiconductor switches or of the drive signals for the semiconductor switches used for driving the motor. In the case of a three-phase motor, three half-bridges for driving the motor include a total of six semiconductor switches; the drive pattern, thus, encompasses the time profiles of the drive signals of these six semiconductor switches. The period with which the drive patterns recur in this case corresponds to the time duration in which the rotating field completes one revolution. The mechanical rotation that the rotor of the motor experiences during a revolution of the rotating field is dependent on the number of pole pairs of the motor. The relationship whereby the angle of a mechanical rotation of the rotor corresponds to the quotient of the angle of the rotating field (the electrical revolution) and the number of pole pairs holds true in this case.

So that the drive pattern can be generated in a suitable manner, it is necessary to detect the angular position of the motor.

For driving the motor coils there are various methods that effect various drive patterns. In some of these methods, such as the so-called block commutation, for example, the switches are driven such that there is always one of the motor windings that is not connected to one of the supply potentials during a time period within the drive cycle. To detect the motor position, it is known, in the case of this type of driving, to detect the back-induced voltage in the motor winding that is currently connected to no voltage supply. This back-induced voltage has a periodic time profile with a period duration that depends on the rotational speed of the motor or on the time duration per revolution. The back-induced voltage intersects a voltage value representing a zero point of the motor twice per period, the position of these zero crossings containing a precise item of information about the angle of position of the motor. In the case of a three-phase motor, the temporal profiles of the back-induced voltages are shifted relative to one another in each case by a value that corresponds to a revolution of the rotating field through 120°. Because each of these back-induced voltages has two zero crossings per revolution of the rotating field or one zero crossing per half revolution, the motor position can be determined from these three back-induced voltages with a resolution of 60° relative to one revolution of the rotating field. In such a case, the resolution capability with regard to determining the mechanical position of the motor rises with the number of pole pairs. While the motor position can be determined with a resolution of 60° in the case of one pole pair, a resolution of 30° is already possible in the case of two pole pairs, etc.

Because the zero point of a motor is, generally, not accessible for tapping off the back-induced voltages across the motor windings, it is known to simulate the zero point of the motor, for example, by a star circuit with resistors, and to use as back-induced voltage the potential difference between the accessible terminal of the respective motor winding and the simulated zero point. This method is described for example in Oswald, Wagner, Wasson: "The Brushless Spindle Motor: A background in the motors, magnetics, electrical circuits, and control systems", pages 23 to 26. Jufer, Osseni: "Back EMF Indirect Detection for Self-Commutation of Synchronous Motors", European Power Electronics, Grenoble, September 22 to 24, pages 1125 to 1129, discloses calculating the third harmonic of the back-induced voltage to deduce the motor position therefrom.

FIG. 1 shows a circuit diagram of a motor with a circuit configuration for determining the motor position according to the prior art.

The motor is represented by three coils L1, L2, L3 that are connected to a common zero point N by one of their terminals in each case in a star circuit. Three half-bridge circuits 10, 20, 30 are present for driving the motor, which half-bridge circuits each include a series circuit formed by a first semiconductor switch (high-side switch) H1, H2, H3 and a second semiconductor switch (low-side switch) L1, L2, L3, which are connected between a terminal for a first supply potential VS and a terminal for a second supply potential or reference-ground potential GND. Each of the half-bridges 10, 20, 30 has an output A, B, C, an output A, B, or C in each case being connected to one of the motor windings or one of the three terminals of the motor.

The profile of drive signals in_H1, . . . , in_L3 for the switches H1, . . . , L3 in the case of a block commutation is illustrated in FIG. 2A for a time duration corresponding to a revolution of the motor through 360°+60°. The illustration of the drive signals is chosen such that the respective semiconductor switch H1, . . . , L3 is in the on state if the associated drive signal in_H1, . . . , in_L3 assumes a high level, and that the respective semiconductor switch is in the off state if the associated drive signal assumes a low level. In FIG. 2A, in_H1 designates the drive signal of the high-side switch H1 of the first half-bridge 10, in_L1 designates the drive signal of the low-side switch L1 of the first half-bridge, in_H2 designates the drive signal of the high-side switch H2, in_L2 designates the drive signal of the low-side switch L2, in_H3 designates the drive signal of the high-side switch H3, and in_L3 designates the drive signal of the low-side switch L3.

During the block commutation, at an arbitrary point in time, in each case a maximum of one of the high-side switches H1, H2, or H3 and only a maximum of one of the low-side switches L1, L2, or L3 are in the on state, the semiconductor switches of the same half-bridge usually never being in the on state simultaneously. Through a suitable temporal change of the switching states of the semiconductor switches H1, L1, H2, L2, H3, L3 and a resultant change of the phase currents in the motor windings, a rotating field arises that effects a rotation of the rotor in the motor. In FIG. 2A, the temporal sequence of the drive signals per motor revolution is subdivided into six time segments that each correspond to a motor rotation through about 60° and during which in each case one of the high-side switches and one of the low-side switches undertake the driving of the motor. These are the high-side switch H1 and the low-side switch L2 during a first time period designated by "1", the high-side switch H3 and the low-side switch L2 during a time period designated by "2", the high-side switch H3 and the low-side switch L1 during a period designated by "3", etc. This drive pattern recurs starting from the segment designated by "7", in which the driving of the switches H1, . . . , L3 corresponds to that in the segment "1".

During one of these time periods, during which always the same high-side switch and the same low-side switch undertake the driving of the motor, a current flows through two of the windings, namely, the coils that are connected to the half-bridges whose semiconductor switches are in the on state. These are the windings 1 and 2, for example, in the time segment "1". A back-induced voltage EA, EB, EC can, then, be tapped off across the respective non-energized winding (winding 3 during the time segment "1"), the time profile of which voltage is illustrated in FIG. 2B. The time profiles of the back-induced voltages across the windings 1, 2, 3 are periodic with a period duration that corresponds to a complete revolution of the motor, and are offset relative to one another in each case by a value that corresponds to a revolution of the rotating field through about 120°. The time profiles of the back-induced voltages intersect a zero line, which corresponds to the potential at the motor zero point N, in each case twice per period. With knowledge of the zero points of the back-induced voltages EA, EB, EC of all three coils, the motor position can be determined with an accuracy of 60°.

Because the motor zero point N usually cannot be contact-connected, it is known to simulate the zero point, for example, by a resistor network RN, and to compare the potentials at the terminals of the motor with the potential of the simulated zero point NN, as is illustrated in FIG. 1.

To set the current flowing into the motor, usually only one of the two switches that undertake the driving of the motor during one of the segments "1", "2", etc., is driven into the on state permanently, while the other is driven in pulsed or pulse-width-modulated fashion. In the example in accordance with FIG. 2A, the high-side switch H1, H2, H3 is in each case driven into the on state permanently, while the low-side switch is driven in clocked fashion. The current consumption of the motor windings energized by the two switches is, then, dependent on the duty ratio with which the low-side switch is respectively driven. What is problematic in such a case is that a high-frequency interference voltage is superposed on the back-induced voltage as a result of the clocked driving of one of the two switches, which interference voltage makes it considerably more difficult to evaluate the voltage that is to be measured. To enable the back-induced voltage to be evaluated, it is known to filter the potential at the terminal or the back-induced voltage of the non-energized winding before the comparison with the potential of the simulated zero point using a low-pass filter, as is illustrated for one of the windings in FIG. 1. While a simple RC filter is represented in FIG. 1 for illustration purposes, in practice, very complex filters are necessary to achieve a satisfactory result in the filtering of the back-induced voltage and, thus, in the determination of the motor position.

Such filters have to be constructed externally and lead not only to considerable costs but also to a significant signal deformation, for example, to a speed-dependent phase shift.

SUMMARY OF THE INVENTION

It is accordingly an object of the invention to provide a method and device for detecting the motor position of an electric motor that overcome the hereinafore-mentioned disadvantages of the heretofore-known devices and methods of this general type and in which the back-induced voltage in the motor windings is evaluated, but in which no complex filters are required for the evaluation.

With the foregoing and other objects in view, there is provided, in accordance with the invention, a method for detecting a motor position of a motor having at least two motor windings and at least two terminals for the motor windings, including the steps of connecting the motor to a drive circuit having a number of switch configurations corresponding to a number of the motor windings, each of the switch configurations having at least one switch and an output terminal, connecting each of the terminals of the motor to an output terminal of a respective one of the switch configurations, providing drive signals assuming one of a first level and a second level to the at least one switch of the switch configurations, the at least one switch of the switch configurations being in one of an on state and an off state dependent upon a level of the drive signals, subjecting the first and second levels of the drive signals to a mutually coordinated temporal change, and detecting the motor position by evaluating potentials at the at least two terminals of the motor only during predetermined time periods having a temporal position and a duration derived from the drive signals.

In the case of the method according to the invention for detecting the motor position of a motor, which has three motor windings and three terminals for the motor windings and which is connected to a drive circuit, provision is made for evaluating the potentials at the terminals of the motor only during predetermined time periods whose temporal position and duration are dependent on drive signals that serve for driving high-side switches and low-side switches in half-bridge circuits of the drive circuit. The high-side switches and the low-side switches of the half-bridge circuits are in the on state or in the off state according to these drive signals, which are subject to a mutually coordinated temporal change in order, thereby, to drive the motor winding in temporal alternation and, thus, to effect a motor rotation.

In such a case, the potentials at the terminals of the motor are, preferably, evaluated only during those time periods during which the drive signals are not subject to temporal alternation and during which the drive signals for the two switches that ensure the voltage supply of the motor during a drive period only have in each case the same one of two possible drive levels. In this case "drive period" denotes one of a plurality of temporally successive periods during which a high-side switch of one half-bridge and a low-side switch of another half-bridge undertake the voltage supply of the motor and the other switches are turned off. The potentials at the terminals of the motor are, preferably, evaluated only during those time periods during which both switches that ensure the voltage supply of the motor during a drive period are in the on state.

It is known from theoretical calculations and measurements what maximum value and what minimum value the back-induced voltage of the non-energized winding or the potential at the terminal of the winding that is currently not energized can assume during these switching states during which both switches are in the on state (or else one of the switches is in the on state and the other is in the off state) so that a comparison with a mid-value lying between the maximum value and the minimum value suffices for determining the "zero crossings". A zero point simulation is not necessary in the case of the method according to the invention. Moreover, a filter for filtering the back-induced voltage can be dispensed with. The back-induced voltage is only evaluated during the time durations during which the switching states of the two switches are not subject to any change within a drive period so that the high-frequency interference signal resulting from the clocking of one of the two switches (usually the low-side switch) has no effect during these time durations because the time periods during which the back-induced voltage is evaluated do not coincide with the switching operations.

The time segments during which the switching edges of the drive signals of the switches serving for driving the motor change are, thus, "masked out" during the evaluation of the potentials at the motor terminals. This relates both to changes in the switching edges at the end of one of a plurality of temporally successive drive periods and to changes in the switching edges of one of the switches (usually the low-side switch) within a drive period. A logic circuit that evaluates the drive signals of the high-side and low-side switches to define the time segments during which the potentials at the motor terminals are intended to be evaluated can be realized simply and in space-saving fashion as an integrated circuit, in contrast to a low-pass filter.

In accordance with another mode of the invention, there is provided the step of evaluating the potentials at the at least two terminals of the motor only during at least one time period during which the levels of the drive signals are not subject to any change.

In accordance with a further mode of the invention, the switch configurations are half-bridge circuits each having a high-side switch and a low-side switch.

In accordance with an added mode of the invention, there is provided the step of driving, in a periodically recurring manner during predetermined drive periods, in each case a high-side switch of one half-bridge and a low-side switch of another half-bridge, for driving the motor, into the on state permanently or into the on state in clocked fashion, while the other high-side switches and low-side switches are turned off.

In accordance with an additional mode of the invention, there is provided the step of running through six temporally successive drive periods per revolution of the motor and, for each of the six drive periods, driving a different group each having a high-side switch and a low-side switch one of into the on state permanently and into the on state in clocked fashion.

In accordance with yet another mode of the invention, there is provided the step of precluding an evaluation of the potentials at the at least two terminals of the motor for a predetermined time duration after an end of a drive period.

In accordance with yet a further feature of the invention, during a drive period, there is provided the step of driving a respective high-side switch into the on state permanently while driving the respective low-side switch into the on state in clocked fashion and evaluating the potentials at the at least two terminals of the motor only during at least one time duration during which the high-side switch and the low-side switch are in the on state.

With the objects of the invention in view, there is also provided an evaluation circuit for detecting a motor position of a motor having a number of motor windings including at least two motor windings and at least two terminals for the motor windings, the at least two terminals having potentials, including a drive circuit to be connected to the motor, the drive circuit having a number of switch configurations corresponding to the number of the motor windings, each of the switch configurations having at least one switch having an on state and an off state and an output terminal, the output terminal of a respective one of the switch configurations to be connected to each of the at least two terminals of the motor, drive signals assuming one of a first level and a second level, the at least one switch of the switch configurations being in one of the on and off states dependent upon a level of the drive signals, and at least one logic circuit providing at least one output signal dependent upon at least one of the potentials present at the at least two terminals and the drive signals.

An evaluation circuit according to the invention for determining the motor position of a motor, which has three motor windings and three terminals for the motor windings, includes:
  motor terminals, which are connected to the terminals of the motor;
  drive signal terminals, to which the drive signals of the half-bridge circuits or signals that are dependent thereon are fed; and
  a logic circuit, which provides at least one output signal, which is dependent on at least one of the potentials present at the motor terminals and the drive signals.

In this case, the logic circuit serves for generating an enable signal that defines the time durations at which the potentials at the motor terminals are permitted to be evaluated. To evaluate the potentials at the motor terminals, a comparator configuration is provided, which compares the potential at the respective motor terminal with a reference potential and provides a comparison signal that is evaluated in a manner dependent on the enable signal.

In accordance with yet an added feature of the invention, there are provided motor terminals to be connected to the at least two terminals of the motor and drive signal terminals to which are fed one of the drive signals of the switch configurations and signals dependent upon the drive signals of the switch configurations.

In accordance with yet an additional feature of the invention, there are provided a reference potential and at least one comparator configuration connected to at least one of the motor terminals of the motor and to the at least one logic circuit, the at least one comparator configuration comparing a potential present at the at least one of the motor terminals with the reference potential and providing a comparison signal to the at least one logic circuit.

In accordance with again another feature of the invention, there are provided a reference potential and at least one comparator configuration connected to at least one of the at least two terminals and to the at least one logic circuit, at least one comparator configuration comparing a potential present at the at least one of the at least two terminals with the reference potential and providing a comparison signal to the logic circuit.

In accordance with again a further feature of the invention, the switch configurations are half-bridge circuits, a supply potential is connected to the half-bridge circuits, and the reference potential corresponds approximately to half the supply potential.

In accordance with again an added feature of the invention, there are provided a logic circuit and a multiplexer to be connected to the at least two terminals for feeding the potentials to the multiplexer and connected to the logic circuit, the multiplexer having an output and alternately providing one of the potentials at the output, a signal dependent upon a potential at the output of the multiplexer being fed to the logic circuit.

In accordance with a concomitant feature of the invention, the at least one logic circuit is a number of logic circuits corresponding to the number of motor windings.

With the objects of the invention in view, there is also provided an evaluation circuit for detecting a motor position, including a motor having a number of motor windings including at least two motor windings and at least two terminals for the at least two motor windings, the at least two terminals having potentials, a drive circuit connected to the motor, the drive circuit having a number of switch configurations corresponding to the number of the motor windings, each of the switch configurations having at least one switch having an on state and an off state and an output terminal, the output terminal of a respective one of the switch configurations connected to each of the at least two terminals of the motor, drive signals assuming one of a first level and a second level, the at least one switch of the switch configurations being in one of the on and off states dependent upon a level of the drive signals, and at least one logic circuit providing at least one output signal dependent upon at least one of the potentials present at the at least two terminals and the drive signals.

With the objects of the invention in view, in a motor configuration with a motor having motor positions, a number of motor windings including at least two motor windings, and at least two terminals for the at least two motor windings, the at least two terminals having potentials, there is also provided an evaluation circuit for detecting the motor position, including a drive circuit connected to the motor, the drive circuit having a number of switch configurations corresponding to the number of the motor windings, each of the switch configurations having at least one switch having an on state and an off state and an output terminal, the output terminal of a respective one of the switch configurations connected to each of the at least two terminals of the motor, drive signals assuming one of a first level and a second level, the at least one switch of the switch configurations being in one of the on and off states dependent upon a level of the drive signals, and at least one logic circuit providing at least one output signal dependent upon at least one of the potentials present at the at least two terminals and the drive signals.

Other features that are considered as characteristic for the invention are set forth in the appended claims.

Although the invention is illustrated and described herein as embodied in a method and device for detecting the motor position of an electric motor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a block and schematic circuit diagram of a prior art motor with a drive circuit having half-bridge circuits and an evaluation circuit;

FIG. 2 is a timing diagram of prior art drive signals for switches of the half-bridge circuit in the case of block commutation;

DESCRIPTION OF THE PREFERRED EMBODIMENTS

In the figures, unless specified otherwise, identical reference symbols designate identical parts with the same meaning.

Figure 4:
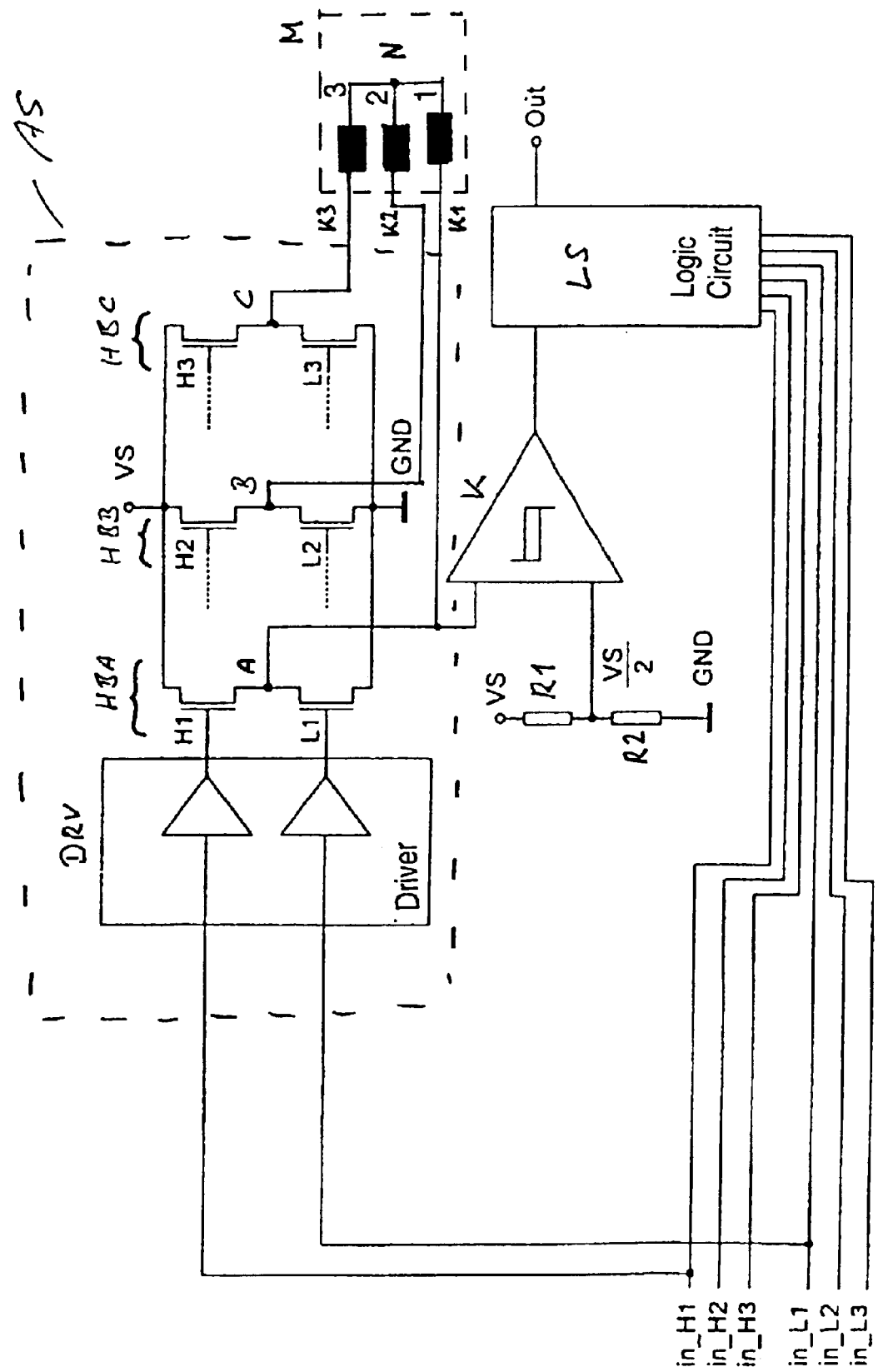
FIG. 4 is a block and schematic circuit diagram of a circuit configuration with a motor, a drive circuit for the motor, and an example of an evaluation circuit according to the invention.

With reference to FIG. 4, the invention relates to a method for evaluating the motor position of a motor M, which has three terminals K1, K2, K3, the terminals K1, K2, K3 in each case being connected to output terminals A, B, C of half-bridge circuits HBA, HBB, HBC. The half-bridge circuits HBA, HBB, HBC each have a high-side switch H1, H2, H3 and a low-side switch L1, L2, L3, which are connected between a supply potential VS and a reference-ground potential GND. The switches H1, . . . , L3 are each configured as a MOSFET whose drain-source paths are connected in series, a node common to the drain-source paths in each case forming the output terminal A, B, C of one of the half-bridges HBA, HBB, HBC. The high-side switches H1, H2, H3 and the low-side switches L1, L2, L3 are driven by drive signals in_H1, in_L1, in_H2, in L2, in_H3, in_L3, which are fed to the gate terminals of the semiconductor switches H1, . . . , L3. These drive signals in_H1, . . . , in_L1 are provided by a non-illustrated microcontroller, for example, only the feeding of the drive signals in_H1, in_L1 to the switches H1, L1 of the first half-bridge HBA being illustrated in FIG. 4, for reasons of clarity. In FIG. 4, these signals in_H1, in_L1 are amplified by a driver circuit DRV to adapt them to the level required for driving the switches H1, L1.

To illustrate an exemplary embodiment of the method according to the invention, FIG. 3, again, shows the temporal profiles of the drive signals in_H1, . . . , in_L3 in the case of block commutation and the resultant temporal profiles of the back-induced voltages EA, EB, EC. The time duration that corresponds to one revolution of the motor is subdivided into six drive periods "1", "2", "3", "4", "5", "6", during each drive period one of the high-side switches H1, H2, H3 being driven into the on state permanently, which is illustrated by the filled-in bar representing the drive levels of the high-side switches. In addition, during each drive period a low-side switch is driven in a pulsed or clocked fashion, which is illustrated by the hatched bars representing the drive levels of the low-side switches. The clocked driving of the low-side switches serves for setting the current consumption of the motor windings L1, L2, L3, but has the effect that a high-frequency signal (not specifically illustrated) is superposed on the back-induced voltages EA, EB, EC.

In the case of the method according to the invention, during the evaluation of the back-induced voltages EA, EB, EC or of the potentials present at the terminals of the motor M, the drive signals in_H1, . . . , in_L3 are taken into account to perform an evaluation only when the levels of the drive signals in_H1, . . . , in_L3 are not subject to any change, in order, thus, to "mask out" the high-frequency signal that results from the change in the drive levels and superposed on the back-induced voltages.

Figure 3:
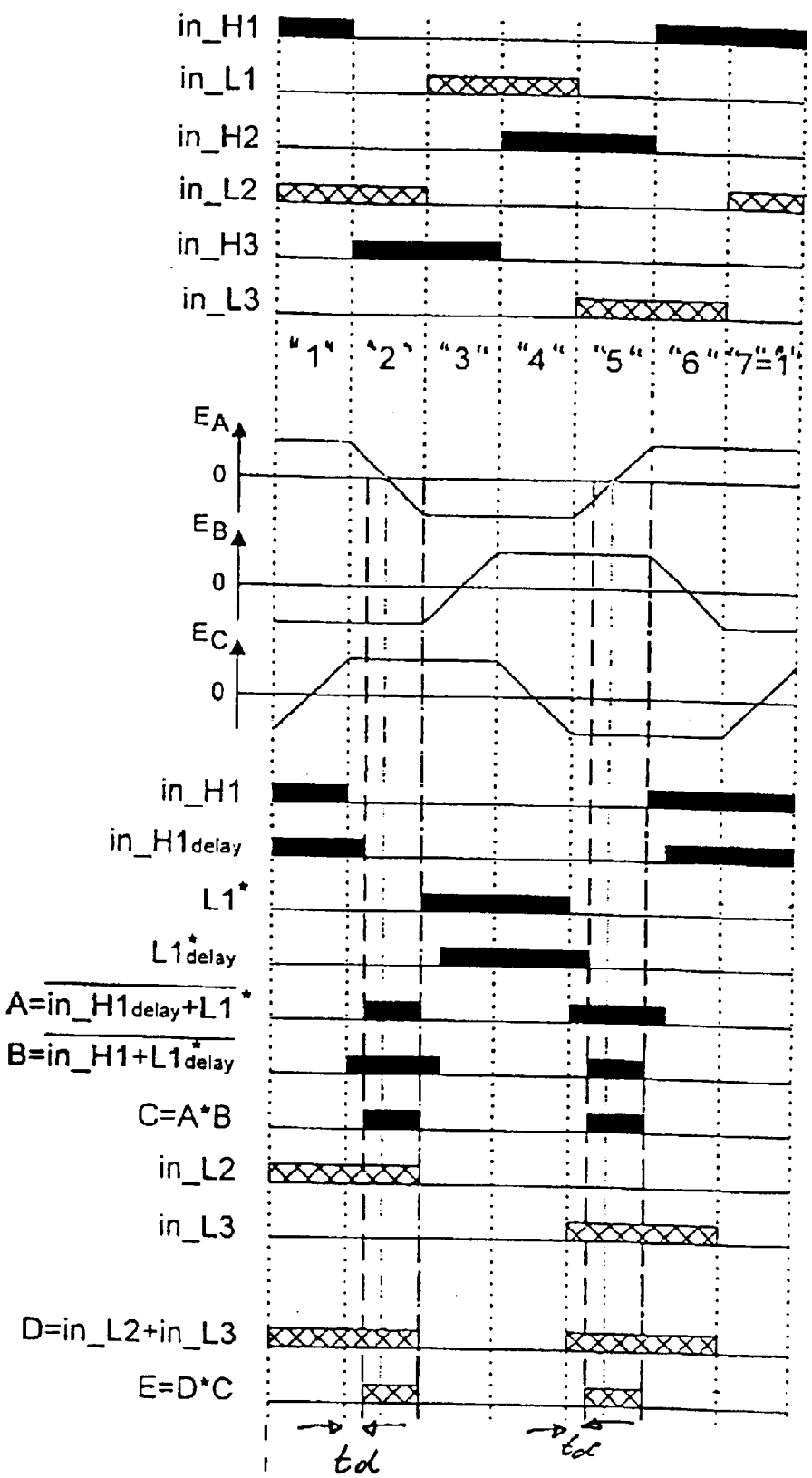
FIG. 3 is a timing diagram of profiles of drive signals and of back-induced voltages in the case of block commutation and temporal profiles of the signals derived from the drive signals for the purpose of providing an enable signal in an exemplary embodiment of the method according to the invention.

In an embodiment of the method according to the invention that is explained below with reference to FIG. 3, an enable signal E is derived from the drive signals in_H1, . . . , in_L3, which are generated in a known, mutually coordinated pattern, for the purpose of evaluating each of the back-induced voltages EA, EB, EC, which enable signal determines the time periods within which the back-induced voltages EA, EB, EC are permitted to be evaluated in order to determine the zero crossings. In such a case, FIG. 3 illustrates the procedure for generating the enable signal E for the evaluation of the back-induced voltage EA of the first motor winding. The generation of a corresponding enable signal for the other two motor windings functions correspondingly.

The method according to the invention makes use of the knowledge that zero crossings of the back-induced voltages EA, EB, EC can only take place during specific drive periods. In the example illustrated, zero crossings of the back-induced voltage EA of the first motor winding L1 can only occur during the drive period "2", during which the low-side switch L2 of the half-bridge HBB and the high-side switch H3 of the half-bridge HBC undertake the supply of the motor M, and during the drive period "5", during which the low-side switch L3 of the half-bridge HBC and the high-side switch H2 of the half-bridge HBB undertake the supply of the motor M. The method according to the invention has the task of determining the precise instant of the zero crossing within this time period.

During predetermined time periods that are shorter than the high periods of the drive signals in_L2 and in_L3, respectively, within the drive periods "2" and "5", the enable signal E corresponds to the drive signal in_L2 or in_L3 of the respective low-side switch L2 or L3 and, moreover, has a lower level (low level). Accordingly, within predetermined time durations within the drive periods "2" and "5", the enable signal E is a signal that is clocked in accordance with the drive signal in_L2, in_L3 of the corresponding low-side switch L2, L3, the clocked periods of the enable signal E beginning in a manner delayed by a time duration td after the beginning of the respective drive period "2" and "5". In the case of the method according to the invention, the zero crossings of the back-induced voltage EA are evaluated only when the enable signal has a high level. The back-induced voltage EA is, thus, evaluated only during time periods that begin in a manner time-delayed by td after the beginning of the respective drive period "2" and "5" and end with the end of the drive periods "2" and "5" and if the drive signal in_L2, in_L3 of the low-side switch that undertakes the supply of the motor during the respective drive period "2" and "5" has a high level.

The time delay td relative to the beginning of the drive periods "2" and "5" has the effect that fluctuations of the back-induced voltage EA that result from the changeover from the high-side switch H1 to the high-side switch H3 at the beginning of the drive period "2" and in the event of the changeover from the low-side switch L1 to the low-side switch L3 at the beginning of the drive period "5" cannot influence the determination of the zero crossing.

In the case of the exemplary embodiment illustrated in FIG. 3, to generate the enable signal E, firstly a logic signal C is generated, which determines the temporal position of the clocked period of the enable signal E and which, to generate the enable signal E is combined by ANDing with the drive signal in_L2, in_L3 of the respective low-side switch, the logic signal C in the present case being combined with a logic signal D that corresponds to an ORing of the signals in_L2 and in_L3, which do not overlap temporally.

The logic signal C is substantially formed from the drive signal in_H1 of the high-side switch H1 and the drive signal in_L1 of the low-side switch L1, use being made here of the fact that the temporal interval between the end of a high period of the signal in_H1 and the beginning of a clocked period of the signal in_L1 defines the drive period "2", and that the temporal interval between the end of the clocked profile of the signal in_L1 and the beginning of a high period of the signal in_H1 defines the temporal duration of the drive period "5". To generate the logic signal C, firstly a delayed signal in_H1delay is formed from the signal in_H1.

Furthermore, a signal L1* is formed from the signal in_L1, the signal L1* being a signal with a high level, the beginning of which corresponds to the beginning of the clocked profile of the signal in_L1 and the end of which corresponds to the end of the clocked profile of the signal in_L1. A signal L1*delay is generated from the signal L1*. The delay of the signals in_H1delay relative to in_H1 and L1*delay relative to L1* corresponds to the time duration td by which the enable signal E is temporally offset relative to the start of the drive periods "2" and "5".

A logic signal A is formed from the signal in_H1delay by ORing with the signal L1* and subsequent inversion, which logic signal is ANDed with a signal B to generate the logic signal C. In this case, the logic signal B is formed from the signal in_H1 by ORing with the signal L1*delay and subsequent inversion.

The high level of the enable signal E, thus, prescribes, for the evaluation of the back-induced voltage EA of the winding L1 during the drive periods "2" and "5", the time periods during which both the high-side switch H1 or H2 and the low-side switch L2 or L3 are in the on state. With knowledge of the maximum value and the minimum value of the back-induced voltage EA or of the potential at the terminal A if both switches are in the on state, a simple comparison with the mid-value between the maximum and minimum potential values is used to ascertain whether or not a zero crossing has taken place within one of the time periods prescribed by the enable signal. In the case of the configuration in accordance with the figure, in which the motor windings 1, 2, 3 are connected to a voltage between the supply potential VS and reference-ground potential GND, the potentials at the terminals A, B, C fluctuate between supply potential VS and reference-ground potential GND if the high-side switch and the low-side switch, which supply the motor during one of the drive periods, are in the on state. To determine the "zero crossings" of the back-induced voltages, it, thus, suffices, in the case of the method according to the invention, to compare the potentials at the terminals A, B, C with a potential VS/2 during high periods of the respective enable signal (the enable signal E for the back-induced voltage EA).

Preferably, in the case of the method according to the invention, a signal that represents a zero crossing that has taken place is generated only when the same comparison results between the potential at the terminal A, B, C and half the supply potential VS/2 is determined during a plurality of successive high periods of the enable signal E within a drive period ("2" or "5" in FIG. 3).

Figure 8:
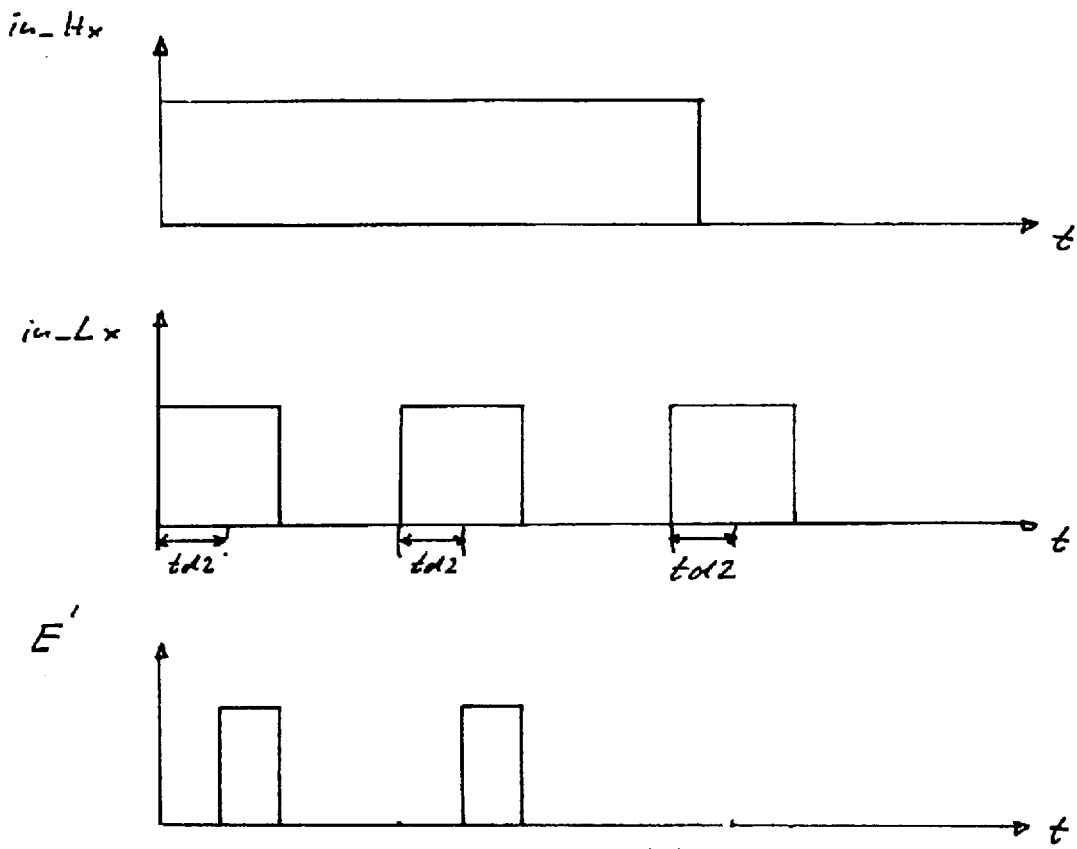
FIG. 8 is a series of graphs illustrating temporal profiles of a drive signal of a high-side switch and of a low-side switch for elucidating a method for generating an enable signal according to the invention.

A fundamental method for generating an enable signal E', which method is simple to realize, is elucidated in FIG. 8. In the two upper timing diagrams of FIG. 8, in_Hx and in_Lx designate the temporal profiles of the drive signals for one of the high-side switches and one of the low-side switches that undertake the supply of the motor during one of the drive periods. With reference to FIGS. 2A and 2B, during the drive period "1", these are the high-side switch H1 and the low-side switch L2, etc. In accordance with the method illustrated in FIG. 8, provision is made for beginning the individual periods of the enable signal E' in a manner delayed in each case by a time duration td2 after a rising edge of the clocked low-side signal in order to wait for fluctuations after the edge change, and to have them end with the falling edge of the low-side signal.

Figure 9:
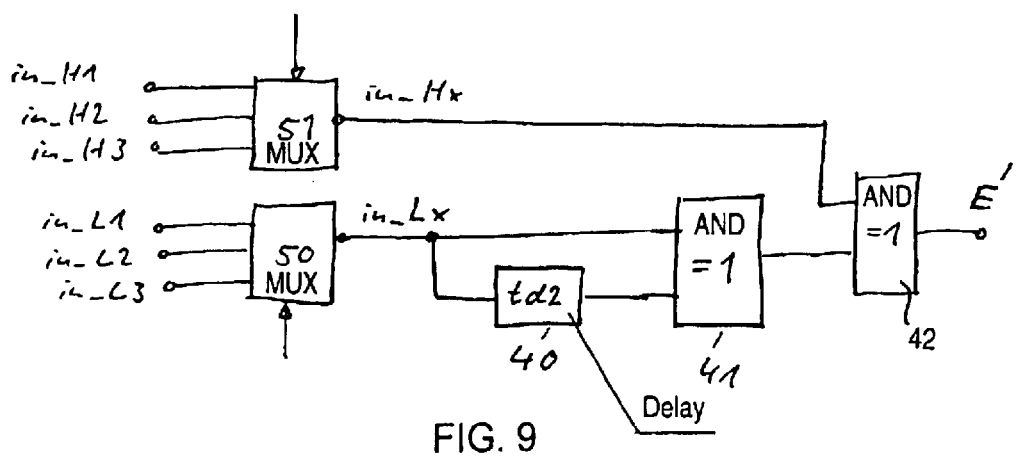
FIG. 9 is a block circuit diagram of a circuit configuration for generating an enable signal according to the method illustrated in FIG. 8.

A circuit configuration for generating this enabled signal from the signal in_Hx and in_Lx is illustrated by way of example in FIG. 9. This configuration includes a delay element 40, to which the low-side signal in_Lx is fed, and an AND element 41, which is connected downstream of the delay element and to which the delayed low-side signal and the undelayed low-side signal are fed. Connected downstream of the AND element 41 is a further AND element 42, to whose other input the high-side signal is fed to ensure that no enable pulse is generated after the high-side signal has assumed a low level.

The signals in_Hx and in_Lx are provided, for example, by a respective multiplexer 50, 51, which are driven by a non-illustrated control circuit in order to feed to the circuit for generating the enable signal precisely the drive signals of the high-side switch and of the low-side switch that are currently undertaking the voltage supply of the motor.

It should be pointed out that a dedicated enable signal can be generated for the evaluation of each of the back-induced voltages EA, EB, EC, and that, in the case of a temporal profile of the drive signals in accordance with FIG. 2, in which only a high-side switch and a low-side switch are in each case driven into the on state simultaneously, a single enable signal can be generated for all the evaluations.

Figure 10:
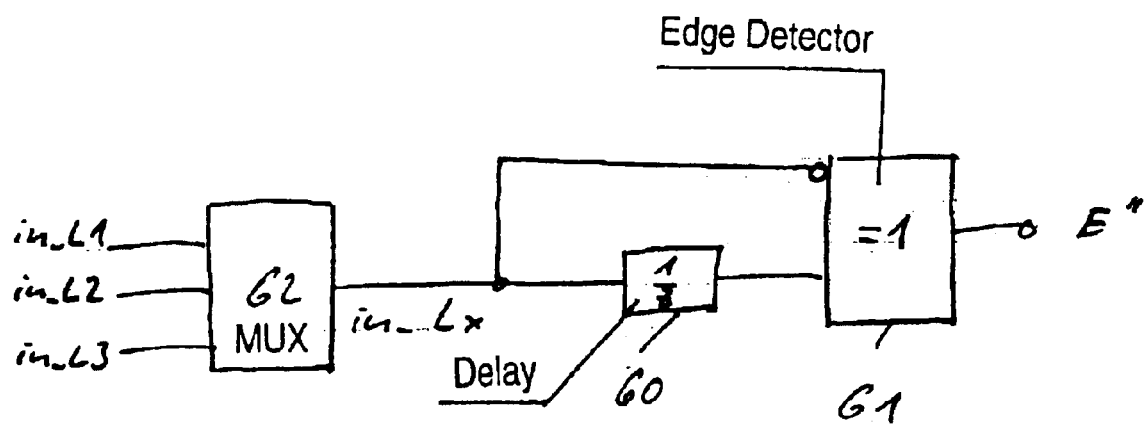
FIG. 10 is a block circuit diagram of an alternative embodiment of the circuit configuration of FIG. 9 for generating an enable signal.

FIG. 10 shows a further configuration for generating an enable signal E", the temporal positions of the pulses of the enable signal in the case of this configuration being oriented toward the falling edge of the low-side signal in_Lx. The configuration, which is, preferably, constructed as a discrete circuit to which samples of the low-side signal in_Lx are fed, includes a delay element, to which the samples of the low-side signal in_Lx are fed, and an edge detector, which is embodied as an AND element with a noninverting input and an inverting input. In such a case, the output signal of the delay element is fed to the noninverting input and the undelayed low-side signal in_Lx is fed to the inverting input. The low-side signal in_Lx is provided from the drive signals in_L1, in_L2, in_L3 by a multiplexer in accordance with the example in FIG. 9.

In the case of the drive circuit in accordance with FIG. 10 the enable signal assumes a high level only briefly, or only for a sampling period, before a falling edge of the low-side signal, in order to enable an evaluation of the back-induced voltages EA, EB, EC. As in the example in accordance with FIG. 10, in this exemplary embodiment, too, the respective high-side signal can be taken into account during the generation of the enable signal E" through ANDing, as is not specifically illustrated.

FIG. 4 illustrates an example of an evaluation circuit for providing an output signal Out, which is dependent on the temporal profile of the back-induced voltage of a motor winding or the temporal profile of the potential at one of the motor terminals A, B, C, the evaluation circuit only being shown for one of the motor windings, namely the motor winding 1, in FIG. 4 for reasons of clarity. Evaluation circuits for the back-induced voltages at the other two motor windings 2, 3 are constructed correspondingly.

The evaluation circuit has a logic circuit LS, to which the input signals in_H1, . . . , in_L3 of the high-side switches and of the low-side switches of the half-bridges HBA, HBB, HBC are fed and that includes a circuit configuration for generating an enable signal E. This circuit configuration, the function of which will be explained in more detail, is configured to generate an enable signal in accordance with the exemplary embodiment elucidated in FIG. 3. It goes without saying that it also possible to use the circuit configurations for generating the enable signals E', E" that are illustrated in FIGS. 9 and 10 and explained above, and other suitable circuit configurations for generating an enable signal. The evaluation circuit, furthermore, includes a comparator K, one of whose inputs is connected to one of the motor terminals K1 and to whose other input is fed a reference potential that, in the exemplary embodiment illustrated, corresponds to half the supply potential VS and is formed from the supply potential VS by a voltage divider R1, R2. The comparator K compares the potential at the motor terminal K1 with the reference potential VS/2.

In such a case, the output signal of the comparator K is evaluated in the logic circuit LS only during those time periods for determining the "zero crossings" during which the enable signal E has a high level, that is to say, only during those time periods during which, with reference to FIG. 3, the low-side switch L2 and the high-side switch H3 or the high-side switch H2 and the low-side switch L3 are in the on state and that are delayed at least by the time duration td relative to the changeover from the high-side switch HI to the high-side switch H3 and the changeover from the low-side switch L1 to the low-side switch L3.

Figure 5:
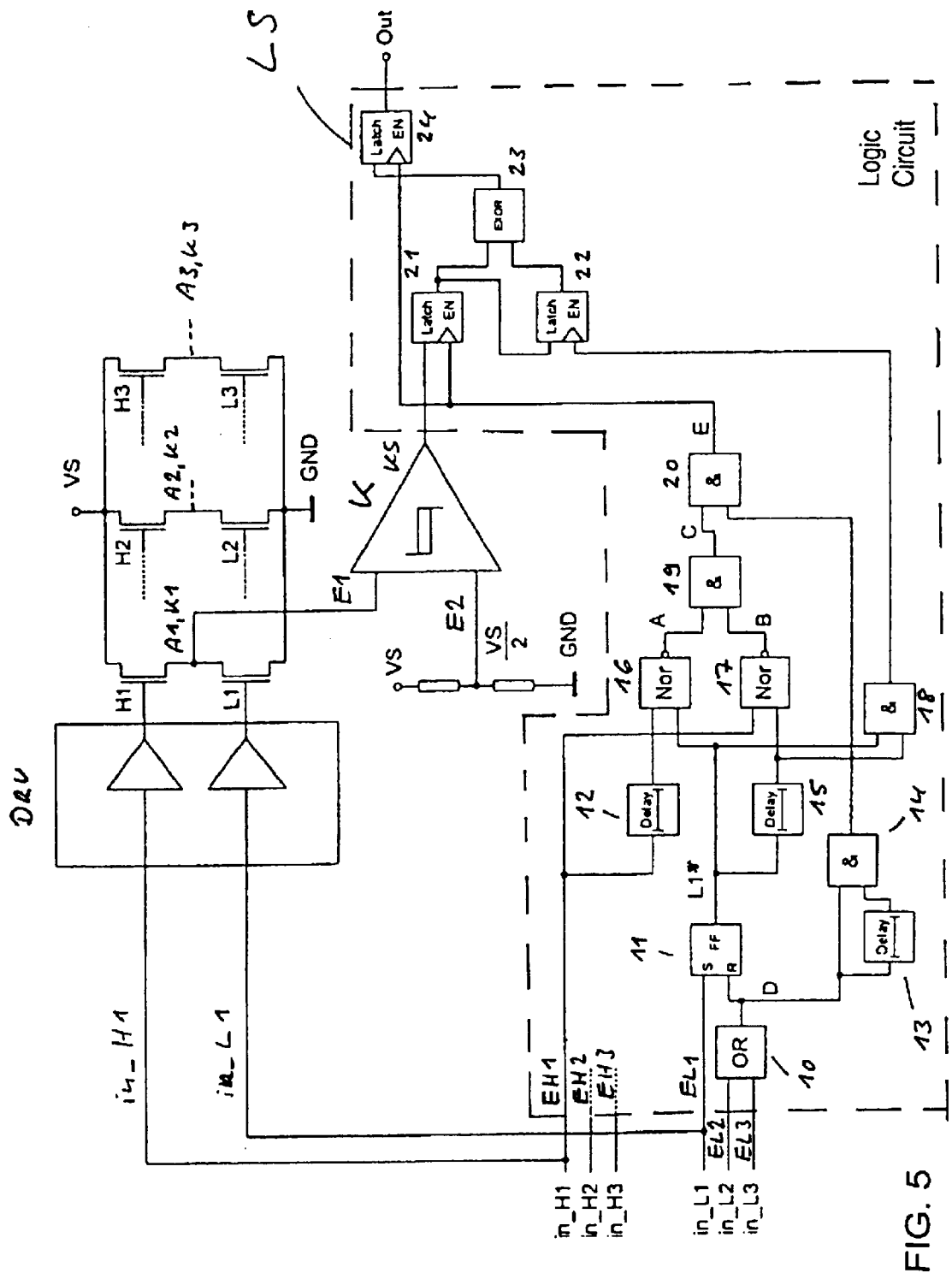
FIG. 5 is a block and schematic circuit diagram of the circuit configuration of FIG. 4 with a detailed illustration of an exemplary embodiment of the evaluation circuit according to the invention.

FIG. 5 illustrates in a detailed manner the construction of an exemplary embodiment of a logic circuit LS in accordance with FIG. 4 for generating an enable signal E and for carrying out the method according to the invention. The enable signal E is formed in the manner illustrated by a logic circuit, having an OR element 10, an RS flip-flop 11, delay elements 12, 13, 15, an AND gate 14, 19, and two inverting OR elements 16, 17, from the signals in_H1, in_L1, in_L2, and in_L3 present at inputs EH1, EL1, EL2, EL3 of the logic circuit LS. An output signal KS of the comparator is fed to a latch 21, the instantaneous value of the output signal KS being stored in the latch only during those time periods during which the enable signal E has a high level.

The output signal of the latch 21 could be applied directly as output signal Out of the logic circuit LS to the output thereof. In the example illustrated, however, the output signal of the latch 21 is also subject to a further logic combination with a signal that is formed by ANDing from the logic signal LS* and the logic signal L1*delay. This signal can assume a high level only when the enable signal E reliably assumes a low level. The output of the latch 21 is fed to the input of a latch 22, the signal resulting from the ANDing of the signal LS* and the signal L1*delay being present at the enable input of the latch 22. The outputs of the latches 21, 22 are fed to an EXCLUSIVE-OR gate 23, whose output is fed to a latch 24, at whose enable input the enable signal E is present.

The logic circuit LS in accordance with FIG. 5, which includes both circuit measures for generating the enable signal E from the drive signals and logic measures for evaluating the comparator output signal KS according to the enable signal E, is, preferably, integrated in a chip.

Figure 6:
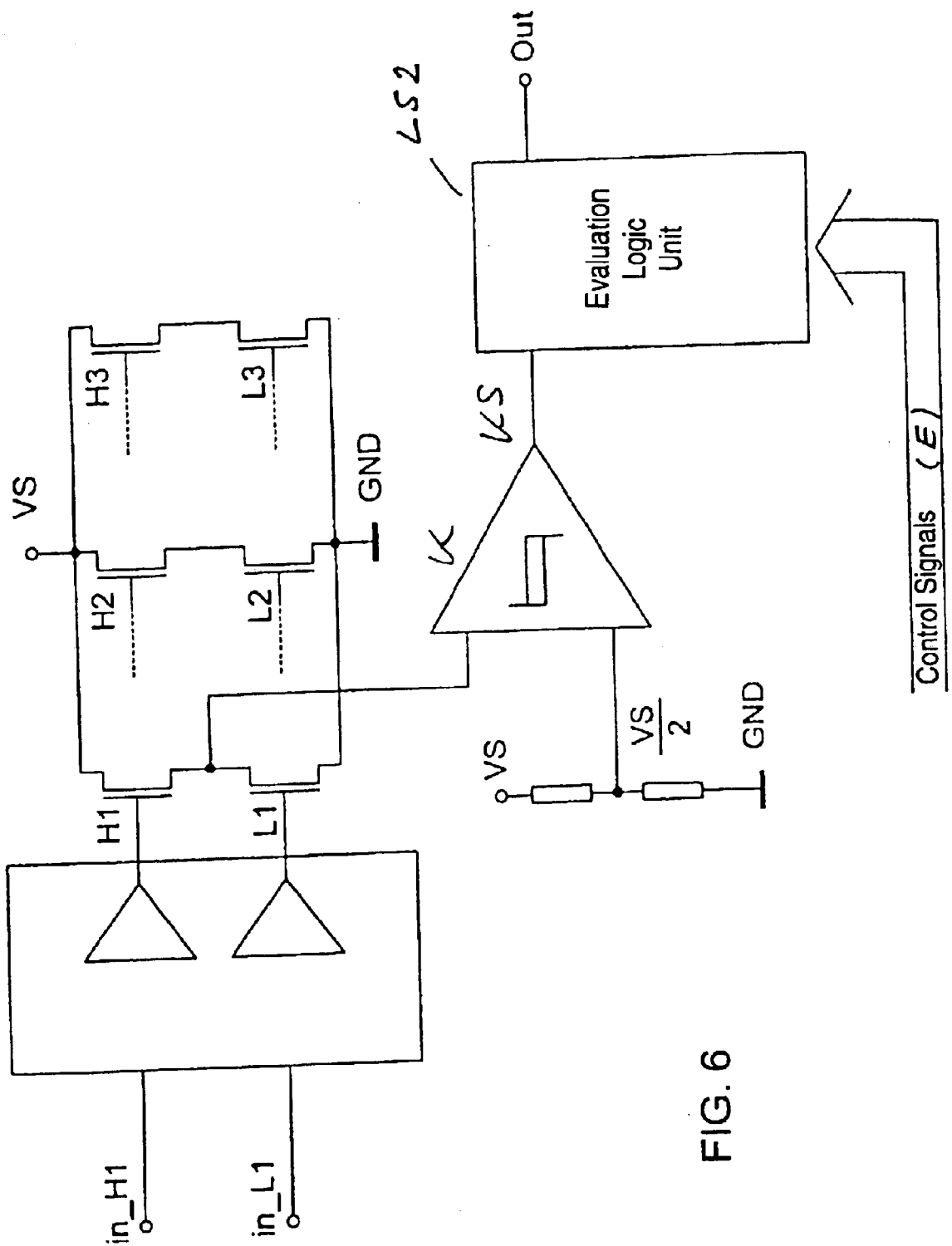
FIG. 6 is a block and schematic circuit diagram of a further exemplary embodiment of a circuit configuration according to the invention with an evaluation circuit.

FIG. 6 shows a further exemplary embodiment, in which it is assumed that enable signals according to which the comparator output signal KS is evaluated are generated externally in an arbitrary manner, for example, already in the microcontroller that also provides the drive signals, and that these control signals are fed to an evaluation logic unit LS2, which evaluates the comparator output signal KS according to the control signals to provide the output signal Out.

Even though only one logic circuit LS or evaluation circuit LS2 is illustrated in FIGS. 4 to 6, it should, again, be pointed out that three logic circuits of this type, each constructed correspondingly, are present in order to be able to evaluate the back-induced voltage of each motor winding.

Figure 7:
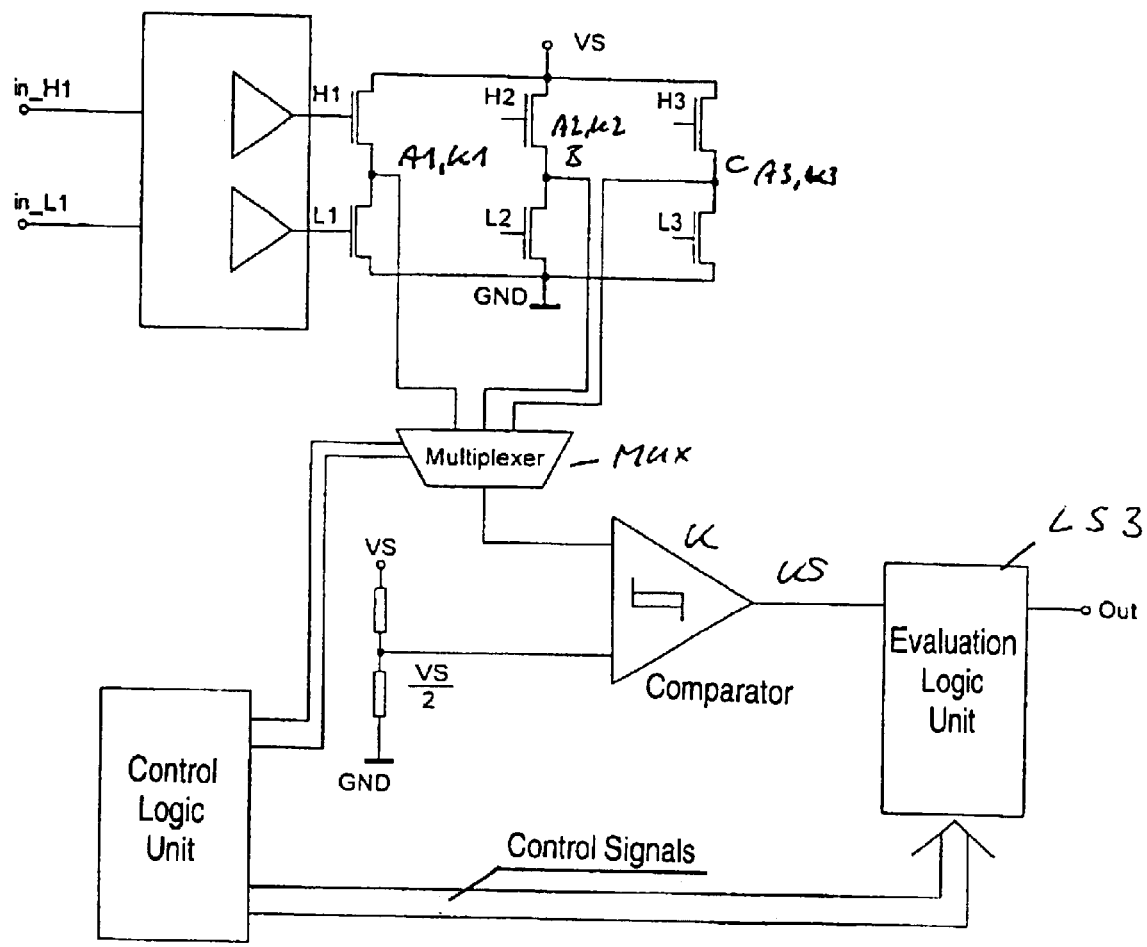
FIG. 7 is a block and schematic circuit diagram of an alternative embodiment of the circuit configuration of FIG. 6 with an evaluation circuit.

FIG. 7 shows an exemplary embodiment of an evaluation circuit according to the invention in which only one comparator is required. A multiplexer MUX is connected upstream of this comparator K, which multiplexer, according to a control logic unit, connects a respective one of the terminals K1, K2, K3 of the motor (not specifically illustrated in FIG. 7) to the input of the comparator K. The control logic unit in accordance with FIG. 7 also generates the control signals according to which the comparator output signal KS is evaluated in the evaluation logic unit to provide the output signal Out.

The present invention, which provides for evaluation of the back-induced voltages in an electric motor in a manner dependent on drive signals for switches that drive the motor, is suitable both for motors in which the motor coils are connected to a supply voltage through half-bridge circuits and for unipolar motors in which there is only one switch in each case for driving a motor coil.

We claim:

1. A method for detecting a motor position of a motor having at least two motor windings and at least two terminals for the motor windings, which comprises:
   connecting the motor to a drive circuit having a number of switch configurations corresponding to a number of the motor windings, each of the switch configurations having at least one switch and an output terminal;
   connecting each of the terminals of the motor to an output terminal of a respective one of the switch configurations;
   providing drive signals assuming one of a first level and a second level to the at least one switch of the switch configurations, the at least one switch of the switch configurations being in one of an on state and an off state dependent upon a level of the drive signals;
   subjecting the drive signals having the first and second levels to a mutually coordinated temporal change and adjusting a power consumption of the motor with pulse-width modulated drive signals; and
   detecting the motor position by evaluating potentials at the at least two terminals of the motor only during predetermined time periods having a temporal position and a duration derived from the drive signals.

2. The method according to claim 1, which further comprises evaluating the potentials at the at least two terminals of the motor only during at least one time period during which the levels of the drive signals are not subject to any change.

3. The method according to claim 1, wherein the switch configurations are half-bridge circuits each having a high-side switch and a low-side switch.

4. The method according to claim 1, which further comprises providing the switch configurations as half-bridge circuits each having a high-side switch and a low-side switch.

5. The method according to claim 4, which further comprises driving, in a periodically recurring manner during predetermined drive periods for driving the motor, a high-side switch of one half-bridge and a low-side switch of another half-bridge one of into the on state and into the on state in clocked fashion, while another of the high-side switches and another of the low-side switches are turned off.

6. The method according to claim 4, which further comprises driving, in a periodically recurring manner during predetermined drive periods, in each case a high-side switch of one half-bridge and a low-side switch of another half-bridge, for driving the motor, into the on state or into the on state in clocked fashion, while the other high-side switches and low-side switches are turned off.

7. The method according to claim 5, which further comprises running through six temporally successive drive periods per revolution of the motor and, for each of the six drive periods, driving a different group each having a high-side switch and a low-side switch one of into the on state and into the on state in clocked fashion.

8. The method according to claim 5, which further comprises precluding an evaluation of the potentials at the at least two terminals of the motor for a predetermined time duration after an end of a drive period.

9. The method according to claim 7, which further comprises precluding an evaluation of the potentials at the at least two terminals of the motor for a predetermined time duration after an end of a drive period.

10. The method according to claim 5, which further comprises, during a drive period, driving a respective high-side switch into the on state permanently while driving the respective low-side switch into the on state in clocked fashion and evaluating the potentials at the at least two terminals of the motor only during at least one time duration during which the high-side switch and the low-side switch are in the on state.

11. The method according to claim 9, which further comprises, during a drive period, driving a respective high-side switch into the on state permanently while driving the respective low-side switch into the on state in clocked fashion and evaluating the potentials at the at least two terminals of the motor only during at least one time duration during which the high-side switch and the low-side switch are in the on state.

12. An evaluation circuit for detecting a motor position of a motor having a number of motor windings including at least two motor windings and at least two terminals for the motor windings, the at least two terminals having potentials, comprising:
   a drive circuit to be connected to the motor, said drive circuit having a number of switch configurations corresponding to the number of the motor windings, each of said switch configurations having:

at least one switch having an on state and an off state; and an output terminal;

said output terminal of a respective one of said switch configurations to be connected to each of the at least two terminals of the motor;

drive signals assuming one of a first level and a second level;

said at least one switch of said switch configurations being in one of said on and off states dependent upon a level of said drive signals; and at least one logic circuit providing at least one output signal dependent upon at least one of the potentials present at the at least two terminals and said drive signals and pulse-width modulated drive signals for adjusting a power consumption of the motor.

13. The evaluation circuit according to claim 12, including:

motor terminals to be connected to the at least two terminals of the motor; and drive signal terminals to which are fed one of:
said drive signals of said switch configurations; and
signals dependent upon said drive signals of said switch configurations.

14. The evaluation circuit according to claim 13, including:

a reference potential; and at least one comparator configuration connected to at least one of said motor terminals of the motor and to said at least one logic circuit, said at least one comparator configuration comparing a potential present at said at least one of said motor terminals with said reference potential and providing a comparison signal to said at least one logic circuit.

15. The evaluation circuit according to claim 13, including:

a reference potential; and at least one comparator configuration connected to at least one of said at least two terminals and to said at least one logic circuit, at least one comparator configuration comparing a potential present at said at least one of said at least two terminals with said reference potential and providing a comparison signal to said logic circuit.

16. The evaluation circuit according to claim 14, wherein:

said switch configurations are half-bridge circuits;

a supply potential is connected to said half-bridge circuits; and said reference potential corresponds approximately to half said supply potential.

17. The evaluation circuit according to claim 12, wherein said switch configurations are half-bridge circuits each having a high-side switch and a low-side switch.

18. The evaluation circuit according to claim 16, wherein said half-bridge circuits each have a high-side switch and a low-side switch.

19. The evaluation circuit according to claim 12, including:

a logic circuit; and a multiplexer to be connected to the at least two terminals for feeding the potentials to said multiplexer and connected to said logic circuit, said multiplexer having an output and alternately providing one of the potentials at said output, a signal dependent upon a potential at said output of said multiplexer being fed to said logic circuit.

20. The evaluation circuit according to claim 12, wherein said at least one logic circuit is a number of logic circuits corresponding to the number of motor windings.

21. An evaluation circuit for detecting a motor position, comprising:

a motor having:
a number of motor windings including at least two motor windings; and.
at least two terminals for said at least two motor windings, said at least two terminals having potentials;

a drive circuit connected to said motor, said drive circuit having a number of switch configurations corresponding to said number of said motor windings, each of said switch configurations having:
at least one switch having an on state and an off state; and.
an output terminal;

said output terminal of a respective one of said switch configurations connected to each of said at least two terminals of said motor; drive signals assuming one of a first level and a second level;

said at least one switch of said switch configurations being in one of said on and off states dependent upon a level of said drive signals; and at least one logic circuit providing at least one output signal dependent upon:
at least one of said potentials present at said at least two terminals; and
said drive signals.

22. The evaluation circuit according to claim 21, including:

motor terminals connected to said at least two terminals of said motor; and drive signal terminals to which are fed one of:
said drive signals of said switch configurations; and
signals dependent upon said drive signals of said switch configurations.

23. The evaluation circuit according to claim 22, including:

a reference potential; and at least one comparator configuration connected to at least one of said motor terminals of said motor and to said at least one logic circuit, said at least one comparator configuration comparing a potential present at said at least one of said motor terminals with said reference potential and providing a comparison signal to said at least one logic circuit.

24. The evaluation circuit according to claim 22, including:

a reference potential; and at least one comparator configuration connected to at least one of said at least two terminals and to said at least one logic circuit, at least one comparator configuration comparing a potential present at said at least one of said at least two terminals with said reference potential and providing a comparison signal to said logic circuit.

25. The evaluation circuit according to claim 23, wherein:

said switch configurations are half-bridge circuits;

a supply potential is connected to said half-bridge circuits; and said reference potential corresponds approximately to half said supply potential.

26. The evaluation circuit according to claim 21, wherein said switch configurations are half-bridge circuits each having a high-side switch and a low-side switch.

27. The evaluation circuit according to claim 25, wherein said half-bridge circuits each have a high-side switch and a low-side switch.

28. The evaluation circuit according to claim 21, including:
- a logic circuit; and
- a multiplexer connected to:
    - said at least two terminals for feeding said potentials to said multiplexer; and
    - said logic circuit, said multiplexer having an output and alternately providing one of said potentials at said output, a signal dependent upon a potential at said output of said multiplexer being fed to said logic circuit.

29. The evaluation circuit according to claim 21, wherein said at least one logic circuit is a number of logic circuits corresponding to the number of motor windings.

30. In a motor configuration with a motor having:
- motor positions;
- a number of motor windings including at least two motor windings; and
- at least two terminals for the at least two motor windings, the at least two terminals having potentials;
- an evaluation circuit for detecting the motor position, comprising:
- a drive circuit connected to the motor, said drive circuit having a number of switch configurations corresponding to the number of the motor windings, each of said switch configurations having:
    - at least one switch having an on state and an off state; and
    - an output terminal;
- said output terminal of a respective one of said switch configurations connected to each of the at least two terminals of the motor;
- drive signals assuming one of a first level and a second level;
- said at least one switch of said switch configurations being in one of said on and off states dependent upon a level of said drive signals; and
- at least one logic circuit providing at least one output signal dependent upon at least one of the potentials present at the at least two terminals and said drive signals.

* * * * *